(12) United States Patent
Hodges et al.

(10) Patent No.: US 7,801,976 B2
(45) Date of Patent: Sep. 21, 2010

(54) SERVICE-ORIENTED ARCHITECTURE SYSTEMS AND METHODS

(75) Inventors: Donna Kay Hodges, Cumming, GA (US); Barrett M. Kreiner, Norcross, GA (US); Jai P. Menon, Alpharetta, GA (US); Tommy W. Walton, Birmingham, AL (US); Thomas W. Rehkopf, Roswell, GA (US); Steven Neil Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1282 days.

(21) Appl. No.: 10/446,569

(22) Filed: May 28, 2003

(65) Prior Publication Data

US 2004/0093381 A1    May 13, 2004

Related U.S. Application Data

(60) Provisional application No. 60/384,043, filed on May 28, 2002.

(51) Int. Cl.
*G06F 15/173* (2006.01)
*G06F 11/00* (2006.01)

(52) U.S. Cl. .................. 709/223; 709/224; 714/4

(58) Field of Classification Search .......... 709/224, 709/202, 223, 239, 242; 714/15, 20, 4, 43, 714/47; 712/201; 707/10
See application file for complete search history.

(56) References Cited

U.S. PATENT DOCUMENTS

| | | | |
|---|---|---|---|
| 5,369,570 A | 11/1994 | Parad | |
| 5,521,814 A | 5/1996 | Teran et al. | |
| 5,548,506 A | 8/1996 | Srinivasan | |
| 5,572,430 A | 11/1996 | Akasaka et al. | |
| 5,664,115 A | 9/1997 | Fraser | |
| 5,727,129 A | 3/1998 | Barrett et al. | |
| 5,740,430 A | 4/1998 | Rosenberg et al. | |
| 5,774,866 A | 6/1998 | Horwitz et al. | |
| 5,799,293 A | 8/1998 | Kaepp | |
| 5,826,236 A | 10/1998 | Narimatsu et al. | |
| 5,878,223 A | 3/1999 | Becker et al. | |
| 5,889,993 A | 3/1999 | Kroeger et al. | |
| 5,940,082 A | 8/1999 | Brinegar et al. | |
| 5,983,194 A | 11/1999 | Hogge et al. | |
| 6,055,569 A | 4/2000 | O'Brien et al. | |

(Continued)

OTHER PUBLICATIONS

"Fireclick's New Blueflame 2.0 Scorches a Path to E-business Profitability," Jan. 19, 2001, printed from http://www.fireclick.com/newsroom/releases/01292001b.html.

(Continued)

*Primary Examiner*—Ario Etienne
*Assistant Examiner*—Gregory G Todd
(74) *Attorney, Agent, or Firm*—Myers Bigel Sibley & Sajovec, PA (57) ABSTRACT

A computer-implemented method includes capturing service properties in one or more service process profiles, receiving a request for service, and interrogating the request and possible services by reviewing service properties captured in the service process profiles. A computer architecture includes a service manage profile and a service meter profile. A computer infrastructure includes a service component including a service-oriented architecture and a serviceware component including a manager for interpreting the service-oriented architecture.

8 Claims, 5 Drawing Sheets

U.S. PATENT DOCUMENTS

| | | | |
|---|---|---|---|
| 6,115,642 | A | 9/2000 | Brown et al. |
| 6,128,701 | A | 10/2000 | Malcolm et al. |
| 6,138,104 | A | 10/2000 | Marchak et al. |
| 6,157,915 | A | 12/2000 | Bhaskaran et al. |
| 6,230,066 | B1 | 5/2001 | Sferro et al. |
| 6,233,493 | B1 | 5/2001 | Cherneff et al. |
| 6,249,769 | B1 | 6/2001 | Ruffin et al. |
| 6,295,513 | B1 | 9/2001 | Thackston |
| 6,298,319 | B1 | 10/2001 | Heile et al. |
| 6,304,861 | B1 | 10/2001 | Ferguson |
| 6,330,586 | B1 | 12/2001 | Yates et al. |
| 6,338,088 | B1* | 1/2002 | Waters et al. ............... 709/226 |
| 6,460,082 | B1* | 10/2002 | Lumelsky et al. ........... 709/226 |
| 6,571,140 | B1 | 5/2003 | Wewalaarachchi et al. |
| 6,615,250 | B1 | 9/2003 | Brunet et al. |
| 6,681,243 | B1 | 1/2004 | Putzolu et al. |
| 6,701,342 | B1* | 3/2004 | Bartz et al. ................. 709/200 |
| 6,748,447 | B1* | 6/2004 | Basani et al. ............... 709/244 |
| 6,823,382 | B2 | 11/2004 | Stone |
| 7,024,497 | B1 | 4/2006 | Maffezoni |
| 7,032,016 | B2* | 4/2006 | Cerami et al. ............... 709/224 |
| 7,039,037 | B2* | 5/2006 | Wang et al. ................. 370/349 |
| 7,130,807 | B1* | 10/2006 | Mikurak ........................ 705/7 |
| RE39,717 | E | 7/2007 | Yates et al. |
| 7,278,156 | B2* | 10/2007 | Mei et al. ..................... 726/11 |
| 7,310,672 | B2* | 12/2007 | Rolia ........................ 709/226 |
| 7,426,551 | B1* | 9/2008 | Benzinger et al. ............ 709/223 |
| 7,467,192 | B1* | 12/2008 | Lemler et al. ............... 709/223 |
| 7,730,172 | B1* | 6/2010 | Lewis ........................ 709/224 |
| 2001/0016492 | A1* | 8/2001 | Igarashi et al. ............... 455/433 |
| 2002/0023119 | A1 | 2/2002 | Gray et al. |
| 2002/0029260 | A1 | 3/2002 | Dobbins et al. |
| 2002/0059148 | A1 | 5/2002 | Rosenhaft et al. |
| 2002/0061741 | A1 | 5/2002 | Leung et al. |
| 2002/0087487 | A1* | 7/2002 | Hassinger ................... 705/400 |
| 2003/0050960 | A1 | 3/2003 | Kawamura et al. |
| 2003/0061256 | A1 | 3/2003 | Mathews et al. |
| 2003/0115311 | A1 | 6/2003 | Johnston-Watt et al. |
| 2003/0135609 | A1* | 7/2003 | Carlson et al. ............... 709/224 |
| 2003/0158785 | A1 | 8/2003 | Erca |
| 2003/0167180 | A1* | 9/2003 | Chung et al. .................... 705/1 |
| 2003/0236745 | A1* | 12/2003 | Hartsell et al. ................. 705/40 |
| 2004/0034607 | A1* | 2/2004 | Piccinelli ..................... 705/80 |

OTHER PUBLICATIONS

U.S. Appl. No. 10/649,511, filed Aug. 26, 2003.
U.S. Appl. No. 10/649,510, filed Aug. 26, 2003.
U.S. Appl. No. 60/384,043, filed May 28, 2002.
U.S. Appl. No. 60/273,088, filed Mar. 2, 2001.
U.S. Appl. No. 10/087,733, filed Mar. 4, 2002.
U.S. Appl. No. 10/293,247, filed Nov. 12, 2002.
U.S. Appl. No. 09/886,071, filed Jun. 20, 2001.

* cited by examiner

SERVICE-ORIENTED ARCHITECTURE SYSTEMS AND METHODS

This application claims priority to and incorporates by reference U.S. provisional application No. 60/384,043 filed on May 28, 2002.

TECHNICAL FIELD

The present invention relates generally to systems and methods for collecting and analyzing data and, more particularly, to service-oriented architecture systems and methods.

BACKGROUND

In the past, Information Technology (IT) depended on target environments that were homogenous, reliable, secure, and centrally owned and managed. As the nature of business evolves; marketing must be concerned with forming transient joint ventures to deliver "virtual products," testing new products for marketplace viability, productizing as fast as possible for as little as possible, and delivering this amalgamation in what appears to be a "seamless" environment that always "knows the user." At the same time, business must be concerned with maximizing use of IT resources to reduce total cost of ownership.

To meet these market requirements and business constraints, IT must now be concerned with collaboration, data sharing and resource sharing across virtual organizations and environments; and the seamless delivery of product and service across virtual organizations and environments. Operations must be concerned with the management of increasingly complex computing environments. Outsourcing models began this transformation; economics and market pressures are pushing the transformation even further to the Utility Computing model. An additional force is also driving the need for automaton-level integration, the sheer numbers and speed at which heterogeneous pervasive computing devices are being introduced at the network edge.

These evolutionary pressures are generating new requirements for distributed application creation, execution and management environments. The utility computing model (resources on demand-soft and hard) mandates the synergistic operationalization of these trends. From an operationalization perspective, utility computing requires traditional off-line autonomous environments (creation, execution and management) to interact in near real time shifting from statically provisioned autonomous silos to systems that are dynamically provisioned across shared heterogeneous resources in response to real-time business needs.

Today, the Internet is still designed primarily for human interpretation and use. Business-to-Business (B2B) and e-commerce experienced limited success with automaton-level integration. Success was hard won through APIs and programmatic incorporation of human-obtained information. Web Services begins to address automaton-level integration. Both lack Internet standards, infrastructure and tooling to support automaton-interrogateable service profiles with location independence.

Accordingly, to strategically align with business objectives, an architecture is required that focuses on interoperability, virtualization and near-real time active management technologies to operationalize the eServices Utility.

SUMMARY

In one general aspect, a computer-implemented method includes capturing service properties in one or more service process profiles, receiving a request for service, and interrogating the request and possible services by reviewing service properties captured in the service process profiles.

Implementations may include one or more of the following features. For example, capturing service properties may include automatically pre-populating the service process profiles and/or storing a disaster recovery snapshot. One or more services may be restored based on the disaster recovery snapshot. Reviewing service properties may include reviewing compliance with a service level agreement.

In another general aspect, a computer architecture includes a service manage profile and a service meter profile. Implementations may include one or more of the following features. For example, the service manage profile may include thresholds, resource/environment requirements, service level characteristics and/or autonomics. The service meter profile may include knowledge for determining whether middleware should be utilized and/or compliance with a service level agreement. The computer architecture may include a service process profile and/or a service adapt profile. The service process profile may include process flows, inputs, outputs, preconditions, effects, resource/environment requirements, and/or service interfaces. The service adapt profile may include context aware adaptations, client profile, preferences, and/or context.

In another general aspect, a computer infrastructure includes a service component having a service-oriented architecture and a serviceware component having a manager for interpreting the service-oriented architecture. Implementations may include one or more of the following features. For example, the computer infrastructure may have a middleware component including middleware and/or edgeware of an enterprise. a metadata component including knowledge captured in one or more service profiles. The computer infrastructure may have a metadata component including a content model, a resource model, a service model, a process model, a business model, and/or a management model. The computer infrastructure may have a process component for metering and managing service profiles. The computer infrastructure may include: a service creation platform, a service validation platform, a service distribution platform, a service discovery platform, a service execution platform, a service level agreement management platform, a service management platform, a device management platform, and/or a user interface modality platform.

Aspects of the present invention may be implemented by a computer system and/or by a computer program stored on a computer readable medium. The computer readable medium may comprise a disk and/or a device.

Other features and advantages will be apparent from the following description, including the drawings, and from the claims.

DETAILED DESCRIPTION

In one general aspect, the present invention is directed to systems and methods for a service-oriented architecture. For simplicity, the basic components of such systems and methods are provided. However, as would be understood by one of ordinary skill in the art, the systems and methods described below may include various other structures and/or processes in actual implementation consistent with aspects of the present invention.

Figure 1:
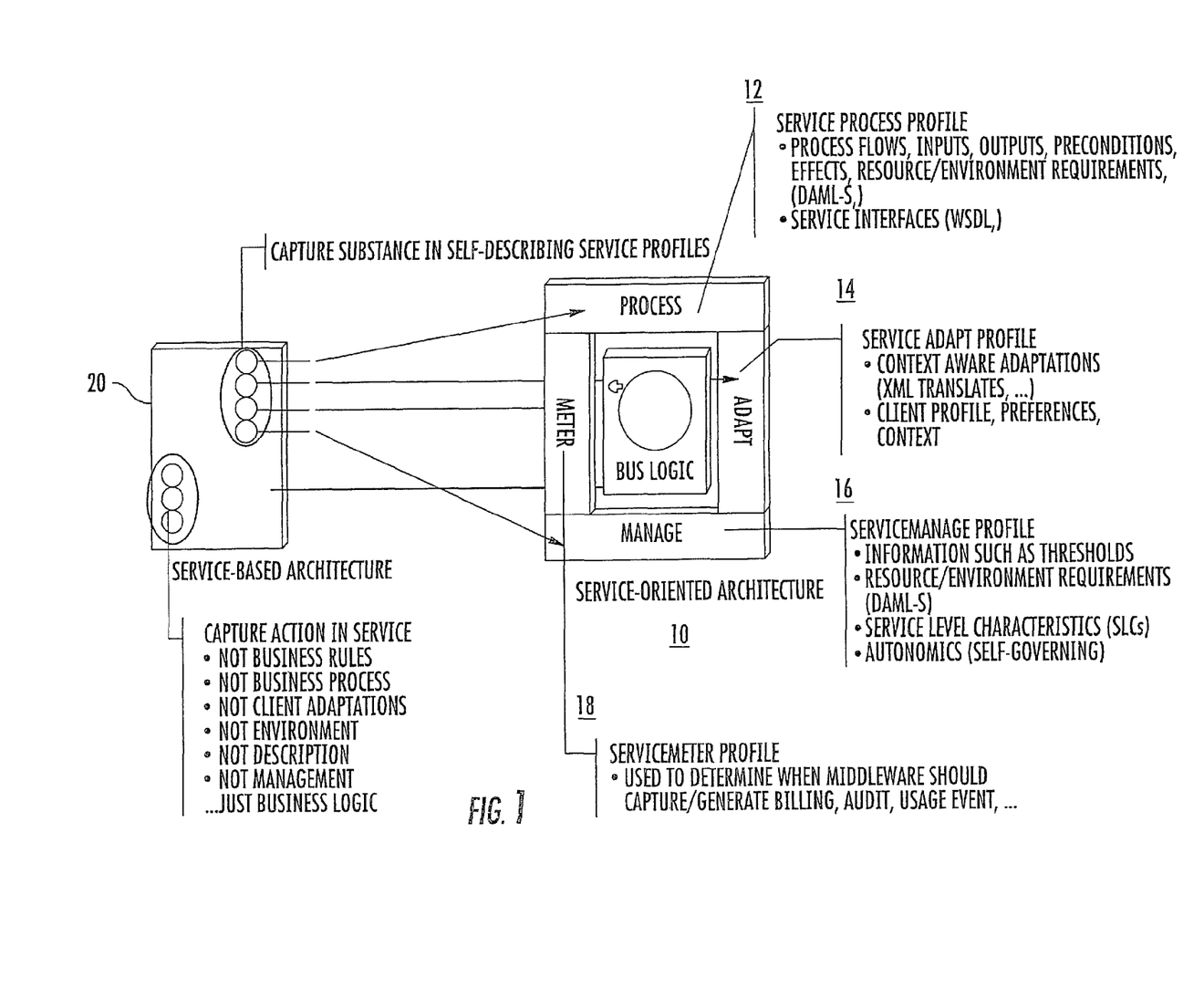
FIG. 1 illustrates one embodiment of a service-oriented architecture according to the present invention.

FIG. 1 illustrates one embodiment of a Service-Oriented Architecture (SOA) 10 according to aspects of the present invention. In general, the SOA 10 may be utilized by any entity 20 such as a network resource that provides Web service and/or grid computing functionality. In one embodiment, a Web service may be defined as an Internet-based modular application that performs a discrete function. Common examples of Web services include, but are not limited to, business services such as credit card authorization, credit verification, security authorization, etc.

A Web service typically supports direct interactions with other software agents using XML-based exchanges via internet-based protocols. In general, Web services build on the loose coupling of the traditional Web programming model, and extend it for use in other kinds of applications. The modular format ensures discrete self-contained services (or atomic services) may be aggregated to orchestrate complete business processes—or a composite service.

Grid computing provides the operationalization infrastructure required for large scale heterogeneous dynamically distributed computing environments that span enterprises across the open Internet.

To enable automaton-level integration, machines must be able to interrogate service profiles to discern use, service process characteristics/requirements, service access, service metering, service management, and available adaptations. In general, however, action (or business logic) of the entity 20 is captured in code and is executable but often is not interrogateable. The SOA 10 therefore captures substance (service and business model characteristics) in self-describing service profiles. Machine-readable (e.g., XML-based) metadata may be used, for example, to capture service properties, and an intelligent infrastructure may read, interpret, and act upon the metadata.

In one implementation, the SOA 10 segregates business logic (or action) from substance—declaratively capturing configuration (in deployment descriptors), description and properties (in service profiles), business rules (in rules sets), and business process (in process flows) as separate elements, each supported by infrastructure in the execution environment. In one embodiment, the separation of substance from action creates four main service profiles: a ServiceProcess profile 12, a ServiceAdapt profile 14, a ServiceManage profile 16, and a ServiceMeter profile 18.

The ServiceProcess profile 12 may include knowledge (e.g., metadata) describing process flows, inputs, outputs, preconditions, effects, resource/environment requirements, and/or service interfaces (e.g., WSDL and DAML-S). The ServiceAdapt profile 14 may include knowledge describing context aware adaptations (e.g., XML translates), client profile, preferences, and/or context. In some implementations, adaptations may be registered such that in response to a request for a particular process, a particular adaptation or set of adaptations is provided that closely matches the request.

The ServiceManage profile 16 may include knowledge describing information such as thresholds, resource/environment requirements, service level characteristics (SLCs) and/or autonomics (self-governing). In one implementation, SLCs for each dimension or each tier are captured.

The phrase "autonomics" is used to describe systems that are self-configuring, self-healing and/or self-managing. Even with autonomics, however, it is important to have an operator.

The ServiceMeter profile 18 may include knowledge that is used to determine when middleware should be utilized, for example, to capture/generate billing audit, usage event, etc. In one implementation, the ServiceMeter profile 18 reflects compliance with a Service Level Agreement (SLA). In general, the SLA may include the agreed upon terms (e.g., response time and costs) in connection with responding to a request. The SOA 10, therefore, can detect an impending SLA failure by a resource (e.g., data center) and re-route "on the fly" to utilize distributed services outside of the resource. The SOA 10 may load or find additonal resources during peak times, for example, and then resume normal operations.

By profiling service, management, business, resource, user, device, element, when/where/how to act (what to do) at specific times during the instantiation of service, the SOA 10 enables engineers to concentrate on creating Internet-based services that are designed for interoperability across domains (not just within an enterprise).

The multi-tiered adaptability of the SOA 10 may be implemented utilizing basic service-oriented design (SOD) principles. In general, (SOD) principles include one or more of: an event-driven architecture, asynchronous systems, loosely coupled services, a priori system and security knowledge that is not codified, and clients that are independent of any policy that might otherwise be enforced by a priori knowledge of technology, vendor, enterprise, etc. In addition, SOD principles may provide that services are not only network-enabled, but also designed to be reliable and secure with very little network or compute latency and very high bandwidth. In some cases, there may be a single administrator, stable membership on the network, constant network topology, and specialized services. As described above, adaptations, environmental configurations, and other service and business model characteristics are captured in the service profiles.

The SOA 10 may be provided within an intelligent infrastructure that enables dynamic adaptation in response to market, technology, and business opportunities leveraging network and network operations assets (physical, soft and mind). The intelligent infrastructure may be used, for example, to model business processes and identify required services in order to meet the needs of a particular enterprise. The infrastructure may facilitate sharing of data, resources, processes, services and business models across boundaries even when designed independently (as with the extended enterprise).

Figure 2:
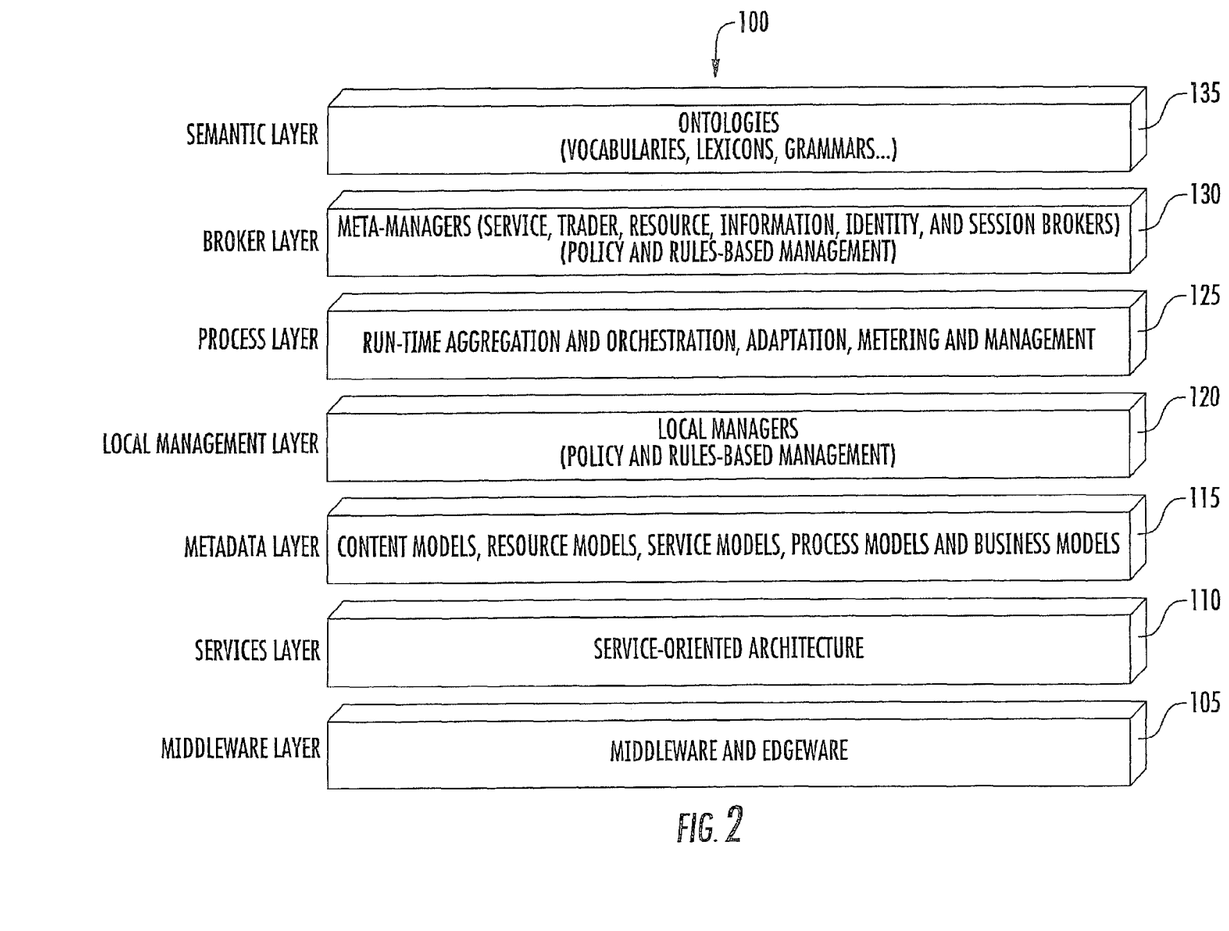
FIG. 2 illustrates one embodiment of a service-oriented architecture infrastructure according to the present invention.

FIG. 2 illustrates the architectural layers of one embodiment of a SOA infrastructure 100. In one embodiment, the SOA infrastructure 100 includes a middleware component 105, a services component 110, a metadata component 115, a local management component 120, a process component 125, a serviceware component 130, and a semantic component 135. In this embodiment, the SOA infrastructure is XML-enabled and captive "applications" enabled by standard middleware (asynchronous publish/subscribe, bulk/batch data, synchronous request/reply, asynchronous queuing) are replaced by composite services that span across enterprises (services layer).

The middleware component 105 may include the operating system, middleware, and edgeware of an enterprise. Examples of middleware include MOMs, TPMONs, commodity technologies such as CORBA, COM, etc., and process and rules engines that provide capabilities such as guaranteed interoperability, management, delivery, event notification, transaction semantics, etc.

Edgeware is a "breed" of middleware that extends traditional middleware capabilities (guaranteed delivery, event notification, transaction semantics,) to the network edge. Edgeware may provide load balancing, caching, application offload, content distribution, security, and/or transactional quality of service under centralized control.

The services component 110 generally enables network-wide use of software components in a networked web environment. In one embodiment, the services component 110 may include a Service-Oriented Architecture (e.g., SOA 10) allowing problems to be modeled in terms of services offered by components to anyone, anywhere over the network. The services component 110 may leverage existing software components and enable them to be published, invoked and discovered ubiquitously over the network using open, interoperable protocols.

The metadata component 115 generally provides machine-readable structures for sharing information. In one embodiment, the metadata component 115 may include knowledge about assets captured in self-describing (often times self-executing) machine-readable XML-based constructs. Metadata is machine-readable and therefore interrogateable by the management, process, broker, and semantic layers. This provides the basis for sharing resources in dynamic fluid ecosystems and adapting product and services to fulfill request.

In one implementation, the metadata component 115 may include content models, resource models, service models, process models, business models, and/or management models. Content models may include knowledge about data assets captured in XML-based content models. Resource models may include knowledge about resource assets captured in XML-based resource profiles. Service Models may include knowledge about ancillary services and parameters (e.g., Peer-based service, Server-based service, CPE-based service, Network-based service, Device-based service) that are needed (and in what order) at each phase of an instantiation's life cycle (e.g., Instantiate-Start-Suspend-Restart-Stop-End). Process models may include knowledge about service assets (software) or process assets captured in XML-based Service-Process profiles. Business models may include knowledge about business-support systems and parameters that are needed (and in what order) to execute business-related functionality (e.g., Create customer record, Retrieve customer record, Update customer record, DRM, Company) captured in XML-based ServiceMeter profiles. Management models may include knowledge about operational- and performance-support systems and parameters that are needed (and in what order) to insure HA/FO/SLA captured in XML-based ServiceManage profiles.

In some embodiments, models may be instantiated by Symbiotic Model Agents (SMAs) that subsume the service, management, and business models for an instantiation of a service. The SMA thereby assumes the service identity/context for that instantiation and act on behalf of a service in a very "smart" intelligent manner. For example, the SMA may obtain the intelligence from the models and the knowledge from the profiles.

A Symbiotic Service Model Agent (SSMA) may subsume the service model and adapt service life-cycle methods to an instantiation of a particular type of service model and its service profiles (e.g., ServiceProcess profile, ServiceAdapt profile). A Symbiotic Management Model Agent (SMMA) may subsume the management model and adapt management methods to an instantiation of a particular type of management model and its ServiceManage profile. A Symbiotic Business Model Agent (SBMA)—may subsume the business model and adapt business methods to and instantiation of a particular type of business model and its ServiceMeter profile.

The local management component 120 may include, within each domain, local managers for maintaining autonomous control and ownership of all components (resources) registered to it. Within an enterprise, rules- and policy-based local managers enable a "local-level" of abstraction. Within a data center, for example, application servers may provide fault tolerance or fail over within a cluster and utility data centers may provide sharing of resources. Local resource managers may manage workloads across Grid clusters (local management layer) and utility infrastructure (utility brokers, utility managers and utility services) and provide negotiation capabilities for services, security credentials, identity credentials, resources, and workflow management across domains (intra- and inter-enterprise).

The process component 125 generally controls runtime execution, metering and management for both business and service process models. In one embodiment, the process component 125 provides run-time aggregation and orchestration, adaptation, metering and management. The process component 125 may implement Business Activity Monitoring (BAM) for the aggregation, analysis, and visualization of relevant and timely information about business activities.

The process component 125 also may implement Policy-Based Computing Services (PBCS) for capturing the expanding roles of system management tools from base monitoring and offline planning to consumers and users of information for near-real time analysis, correlation, prediction, diagnosis and action.

The process component 125 also may implement capabilities such as Quality of Protection (QoP), Quality of Presentation, Quality of Data, etc. that are dependent on the context of each instantiation or use (e.g., is the networks wireline or wireless, what customer premise equipment (CPE) is involved (if any), what end device or devices are involved (PDAs, PCs, phones, etc.), how private is the data, etc.) etc.

The serviceware component 130 generally negotiates contracts among resource suppliers and users, driving evolution through peer-to-peer computing to grid computing. In one embodiment, the serviceware component 130 may include meta-managers for brokering service, context, session, policy, security, identity, resource, and/or information. While respecting local manager autonomy, brokers negotiate bargains or contracts (on behalf of clients) between local managers for use of required components (or resources). Brokers typically do not posses nor require specific knowledge about individual resources (managed by local managers) for which they are negotiating a contract (or use). Brokers work at this level of abstraction with local managers through capabilities-based metadata, policy and rules (e.g., resource categories and taxonomies based on functional capabilities).

In most cases, the knowledge needed to dynamically interpret a service is captured in metadata. For example, a service broker may interrogate the content and service models when determining appropriate response to the request. Based on the interrogation, it may negotiate with the resource broker for resources necessary to instantiate a service(s) in response to a request. In some cases, the service broker may operationalize and makes use of the adaptations at run time, for example, to compose atomic web services together in an end-to-end multidimensional process.

A trader broker may select among available resources (e.g., atomic services) based on a Service Level Agreement (SLA), for example. The resource broker determines which resources are available. The information broker may negotiate based on information about services, resources and data. An identity broker may broker identity and trust credentials through proxies, for example. The trader broker, information broker and identity broker are fundamental components of Grid computing.

The semantic component 135 generally provides normalized semantics across domain edges, allowing linking of data and services in real time. In one embodiment, the semantic component 135 may include Ontologies. The ontology may provide semantic web and semantic services based on the notion that while a service requester may desire performance of a specific process, the requester may not necessarily care what entities perform the steps of the process. In some cases, a composite request may be translated into a semantic request for a number of processes and/or may be matched with one or more registered adaptations.

Figure 3:
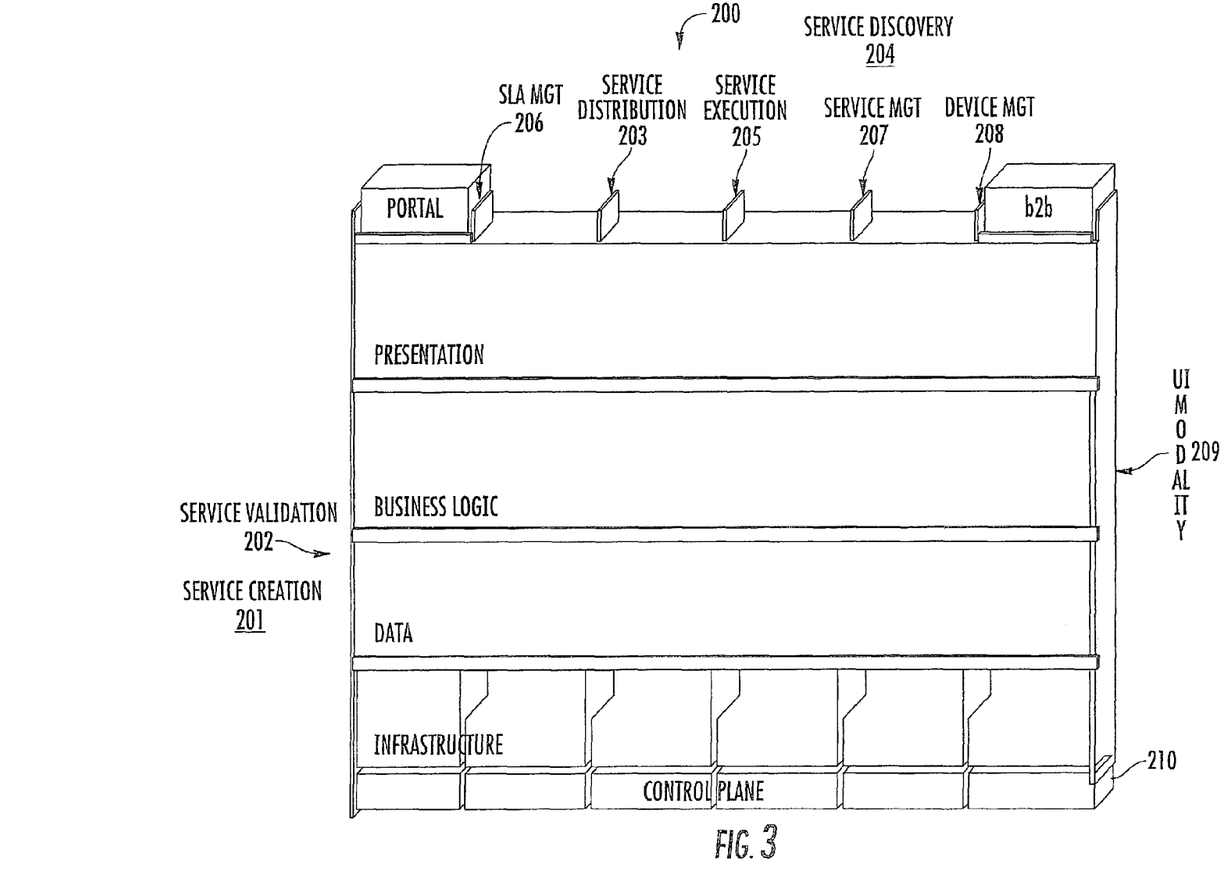
FIG. 3 illustrates one embodiment of a service-oriented architecture infrastructure according to the present invention.

FIG. 3 illustrates one embodiment of an SOA infrastructure 200. In one implementation, the infrastructure 200 may be provided for eServices Platforms and may be composed of several intersecting platforms including: a service creation platform 201, a service validation platform 202, a service distribution platform 203, a service discovery platform 204, a service execution platform 205, a SLA management platform 206, a service management platform 207, a device management platform 208, and a user interface modality platform 209.

The service creation platform 201 may include programs and/or software for building news services and/or retrofitting existing components. The service validation platform 202 may include programs and/or software for validating a new service. In one embodiment, service profiles (e.g., ServiceProcess profile, ServiceAdapt profile, ServiceManage profile, ServiceMeter profile) may be automatically pre-populated during the validation phase of a service distribution life-cycle (create, validate, produce, distribute, retire, grandfather, kill). For example, screen scraping, wire scraping, and/or test scraping may be employed to pre-populate the service profiles. In some implementations, existing test software (e.g., a regression test suite) may be used to pre-populate the service profiles (e.g., ServiceProcess profile, ServiceAdapt profile, ServiceManage profile, ServiceMeter profile).

The service distribution platform 203 may include programs and/or software to distribute services to a new location. In one embodiment, the software as well as requirements for the software may be distributed to the new location, for example, when a failed service is brought up in the new location. The profiles required by the distribution platform are set up by the validation platform 202.

The service discovery platform 204 may include programs and/or software for using security systems (e.g., intrusion detection systems) to identify particular software and services running on various resources and to populate an information service. The SLA management platform 205 may include software and/or services for monitoring and reporting compliance with a SLA. The service management platform 206 may include programs and/or software for controlling runtime execution, metering and management for both business and service process models as well as for negotiating contracts among resource suppliers and users. The device management platform 207 may include programs and/or software for brokering resources. The service execution platform 208 may include programs and/or software for maintaining autonomous control and ownership of resources. Within a data center, for example, application servers may provide fault tolerance or fail over within a cluster and utility data centers may provide sharing of resources. The user interface modality platform 209 may include programs and/or software for enabling device-independent presentation of services.

The infrastructure 200 also includes a control plane 210 for providing operations and control systems. In one implementation, the control plane 210 may run programs and/or software for controlling process functions (e.g., runtime aggregation, orchestration, adaptation, metering, management, policies, DRM) and/or brokering functions (e.g., negotiating contracts among resource suppliers and users).

As shown, several platforms may connect to the control plane 210 by intersecting multiple layers of an application. The application may include, for example, an infrastructure layer, data layer, business logic layer, presentation logic layer, a portal, and a business-to-business node. In some embodiments, the control plane 210 may extend across multiple environments (e.g., data centers, companies).

Figure 4:
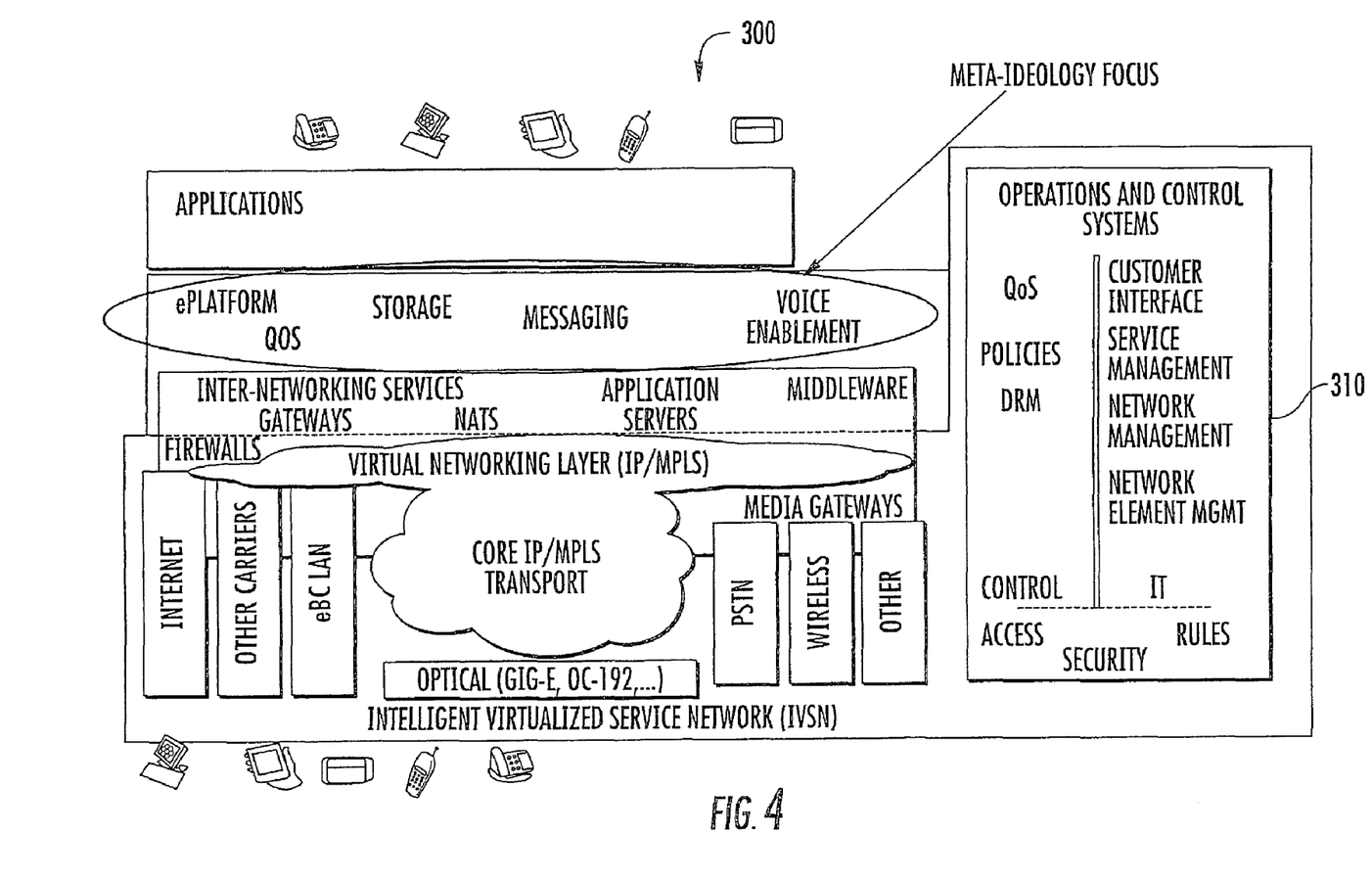
FIG. 4 illustrates one embodiment of a service-oriented architecture infrastructure according to the present invention.

FIG. 4 illustrates one embodiment of a SOA infrastructure 300. In one implementation, the infrastructure 300 may be provided for an intelligent virtualized service network (IVSN). As shown, the IVSN may provide telecommunications services including, for example, voice services, messaging services, and data services. The SOA infrastructure may include a control plane 310 for providing operations and control systems. In one implementation, the control plane 310 may run programs and/or software for controlling process functions (e.g., runtime aggregation, orchestration, adaptation, metering, management, policies, DRM) and/or brokering functions (e.g., negotiating contracts among resource suppliers and users).

Figure 5:
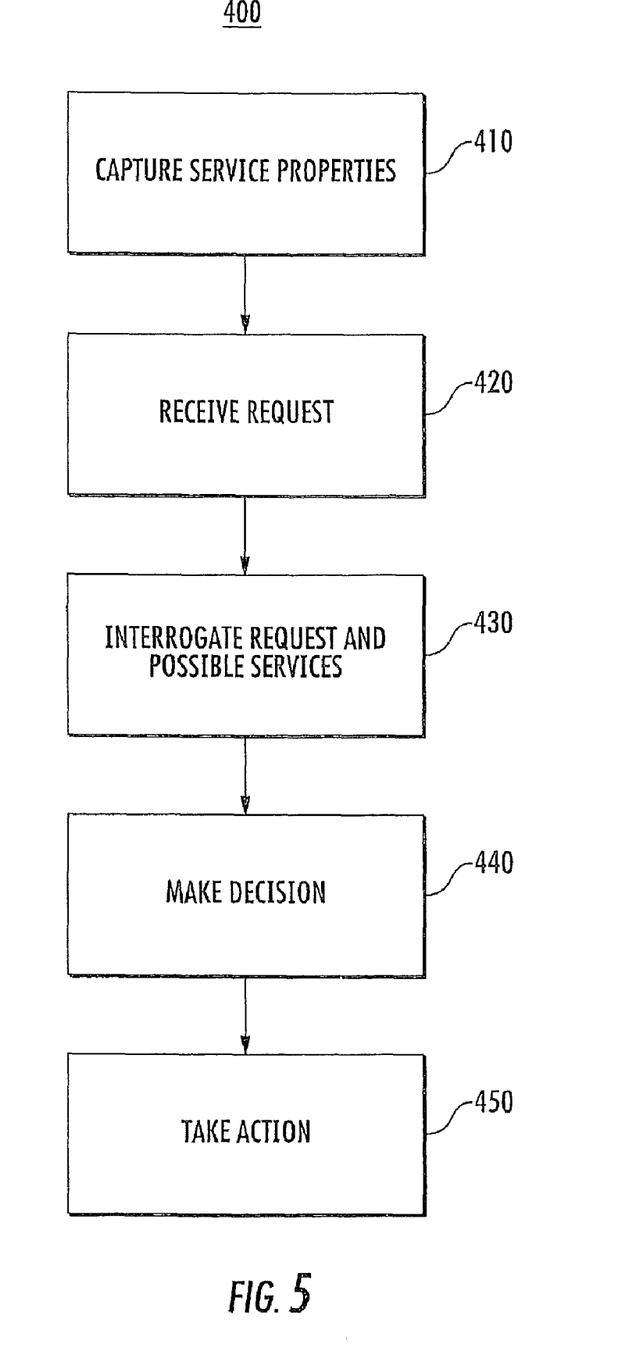
FIG. 5 is a flowchart of one embodiment of a service-oriented architecture method according to the present invention.

A service-oriented architecture method 400 is illustrated in FIG. 5. The method 400 may be implemented by any suitable type of hardware (e.g., device, computer, computer system, equipment, component); software (e.g., program, application, instruction set, code); storage medium (e.g., disk, device); or combination thereof. For example, the method 400 may be performed by one or more elements of a SOA or SOA infrastructure.

At step 410, service properties are captured. In one embodiment, service properties (service and business model characteristics) are captured in self-describing service profiles. Machine-readable (e.g., XML-based) metadata may be used, for example, to capture service properties.

In order to capture service properties, business logic (or action) may be substance—declaratively capturing configuration (in deployment descriptors), description and properties (in service profiles), business rules (in rules sets), and business process (in process flows) as separate elements, each supported by infrastructure in the execution environment. In one embodiment, the separation of substance from action creates service profiles including: a ServiceProcess profile 12, a ServiceAdapt profile 14, a ServiceManage profile 16, and a ServiceMeter profile 18, as described herein.

In some cases, a service provider may capture service properties and create service profiles. In other cases, service profiles (e.g., ServiceProcess profile, ServiceAdapt profile, ServiceManage profile, ServiceMeter profile) for a service provider may be automatically pre-populated during the validation phase of a service distribution life-cycle. Screen scraping, wire scraping, and/or test scraping may be employed to pre-populate the service profiles. In some implementations, existing test software (e.g., a regression test suite) may be used to pre-populate the service profiles (e.g., ServiceProcess profile, ServiceAdapt profile, ServiceManage profile, ServiceMeter profile).

In one implementation, capturing service properties may be performed as part of disaster recovery (DR) procedure. For example, a service may be provided to subscribers whereby metadata is captured in the form of DR snapshots. The DR snapshots may identify the location and status of all software running on particular network resources at a given instant in time. In the event of a system failure, a DR snapshot may be referenced in order to reload the software and restore service.

At step 420 a request is received. In general, the request may be received from any type of device such as a client or network resource. Specific examples of a device include, but are nor limited to, a personal computer (PC), a workstation, a server, a laptop computer, a network-enabled telephone, a network-enabled personal digital assistant (PDA), a microprocessor, an integrated circuit, or any other component, machine, tool, equipment, or some combination thereof capable of responding to and executing instructions.

The request may be for an atomic service and/or a composite service. In some cases, the request may be for service in response to a resource (e.g., data center) failure. In one implementation, a broker may be configured to receive the request.

At step 430, the request and possible services are interrogated by reviewing captured service properties. Interrogating may include, for example, reviewing one or more service profiles (e.g., ServiceProcess profile, ServiceAdapt profile, ServiceManage profile, ServiceMeter profile). Interrogating may include reviewing compliance with a SLA and/or other management requirements. Interrogating also may include matching one or more registered adaptations with a composite service. In some cases content and service models may be accessed to determine an appropriate response to the request.

At step 440 a decision is made. In one embodiment, deployment descriptors and service profiles may be interpreted by an intelligent infrastructure and/or containers to determine appropriate actions on behalf of a service. Based on the interrogation, a resource broker may negotiate for resources necessary to instantiate a service(s) in response to a request. In some cases, a service broker may operationalize and make use of adaptations at run time, for example, to compose atomic web services together in an end-to-end multidimensional.

At step 450 action is taken. In one implementation, a service provider may provide a requested service and/or process. In some cases, a service provider may dynamically adapt and instantiate a business model. Taking action may include loading software based on a DR snapshot in order to restore a failed service.

A number of implementations have been described. Nevertheless, it will be understood that various modifications may be made and that other implementations are within the scope of the following claims.

What is claimed is:

1. A computer-implemented method comprising:
    capturing service properties in one or more self-describing service process profiles with machine readable metadata;
    receiving a request for service, wherein the service request comprises metadata describing software application services;
    interrogating metadata, by a computer system processor, associated with the service request and possible services by reviewing service properties captured in the service process profiles, including validating the security and/or credentials of each of the possible services;
    making a decision based upon results of interrogating the metadata associated with the service request and the possible services; and
    taking action, by the computer system processor, based upon the decision,
    wherein at least one of the service process profiles comprises:
        a service manage profile including metadata describing at least one of thresholds, resource requirements, service level characteristics and autonomics;
        a service meter profile which includes information for determining when to use middleware for billing functions and which can detect an impending Service Level Agreement (SLA) failure by a resource and re-route service to utilize distributed services outside of the resource responsive to a detected impending SLA failure;
        a service process profile including metadata describing at least one of process flows, inputs, outputs, preconditions, effects, and service interfaces; and
        a service adapt profile including metadata describing at least one of context aware adaptations, client profile, preferences and context.

2. The method of claim 1, wherein capturing service properties comprises automatically pre-populating the one or more service process profiles.

3. The method of claim 1, wherein capturing service properties comprises storing a disaster recovery snapshot identifying location and status data of software running on a particular network resource at a particular time.

4. The method of claim 3, further comprising restoring one or more services based on the disaster recovery snapshot.

5. The method of claim 1, wherein reviewing service properties comprises reviewing compliance with a service level agreement.

6. The method of claim 1, further comprising:
    capturing service properties in machine readable metadata; and
    acting upon the metadata.

7. The method of claim 1, wherein taking action based upon the decision includes providing a requested service.

8. The method of claim 1, further comprising negotiating for resources necessary to instantiate a service in response to a request.

* * * * *